United States Patent
Liu et al.

(10) Patent No.: US 11,348,259 B2
(45) Date of Patent: May 31, 2022

(54) DEVICE AND METHOD FOR ALIGNMENT OF MULTI-MODAL CLINICAL IMAGES USING JOINT SYNTHESIS, SEGMENTATION, AND REGISTRATION

(71) Applicant: Ping An Technology (Shenzhen) Co., Ltd., Shenzhen (CN)

(72) Inventors: Fengze Liu, Bethesda, MD (US); Jinzheng Cai, Bethesda, MD (US); Yuankai Huo, Bethesda, MD (US); Le Lu, Bethesda, MD (US); Adam P Harrison, Bethesda, MD (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 49 days.

(21) Appl. No.: 17/110,859

(22) Filed: Dec. 3, 2020

(65) Prior Publication Data
US 2021/0366137 A1 Nov. 25, 2021

Related U.S. Application Data

(60) Provisional application No. 63/029,470, filed on May 23, 2020.

(51) Int. Cl.
*G06K 9/00* (2022.01)
*G06T 7/38* (2017.01)
(Continued)

(52) U.S. Cl.
CPC ............. *G06T 7/38* (2017.01); *G06N 3/0454* (2013.01); *G06T 7/0012* (2013.01); *G06T 7/11* (2017.01);
(Continued)

(58) Field of Classification Search
CPC . G06T 7/38; G06T 7/0012; G06T 7/11; G06T 2207/10081; G06T 2207/20081;
(Continued)

(56) References Cited

U.S. PATENT DOCUMENTS 7,822,291 B2 * 10/2010 Guetter ................. G06T 7/33
382/160
8,077,943 B2 * 12/2011 Williams ................. A61B 6/04
382/128
(Continued)

*Primary Examiner* — Van D Huynh
(74) *Attorney, Agent, or Firm* — Anova Law Group, PLLC

(57) ABSTRACT

An image processing method for performing image alignment includes: acquiring a moving image generated by a first imaging modality; acquiring a fixed image generated by a second imaging modality; jointly optimizing a generator model, a register model, and a segmentor model applied to the moving image and the fixed image according to a plurality of cost functions; and applying a spatial transformation corresponding to the optimized register model to the moving image to align the moving image to the fixed image; wherein: the generator model generates a synthesized image from the moving image conditioned on the fixed image; the register model estimates the spatial transformation to align the synthesized image to the fixed image; and the segmentor model estimates segmentation maps of the moving image, the fixed image, and the synthesized image.

20 Claims, 11 Drawing Sheets

(51) Int. Cl.
    *G06T 7/00*     (2017.01)
    *G06T 7/11*     (2017.01)
    *G06N 3/04*     (2006.01)

(52) U.S. Cl.
    CPC ............... *G06T 2207/10081* (2013.01); *G06T 2207/20081* (2013.01); *G06T 2207/20084* (2013.01)

(58) Field of Classification Search
    CPC . G06T 2207/20084; G06T 2207/30056; G06T 7/33; G06N 3/0454
    USPC ........................................................ 382/128
    See application file for complete search history.

(56) References Cited

U.S. PATENT DOCUMENTS

| | | | |
|---|---|---|---|
| 2007/0036410 A1* | 2/2007 | Ida | G06T 7/30 382/128 |
| 2012/0014559 A1* | 1/2012 | Suehling | G06T 7/33 382/128 |
| 2012/0155734 A1* | 6/2012 | Barratt | G06T 7/344 382/128 |
| 2013/0202173 A1* | 8/2013 | Buckler | G06T 7/143 382/131 |
| 2014/0010431 A1* | 1/2014 | Stayman | G06T 11/006 382/131 |
| 2017/0200290 A1* | 7/2017 | Bhattiprolu | G06V 10/449 |
| 2017/0206670 A1* | 7/2017 | Miyasa | G06T 7/33 |
| 2020/0184660 A1* | 6/2020 | Shi | G06T 7/30 |
| 2021/0049757 A1* | 2/2021 | Zhu | G06T 7/344 |
| 2021/0192758 A1* | 6/2021 | Song | G06T 7/32 |

* cited by examiner

230

Perform supervised learning of the segmentor model using an image dataset with ground-truth segmentation maps
S232

Perform unsupervised joint learning of the generator model and register model according to a first objective function
S234

Perform unsupervised joint learning of the generator model, the register model, and segmentor model according to a weighted sum of the first objective function and a second objective function
S236

FIG. 4

DEVICE AND METHOD FOR ALIGNMENT OF MULTI-MODAL CLINICAL IMAGES USING JOINT SYNTHESIS, SEGMENTATION, AND REGISTRATION

CROSS-REFERENCE TO RELATED APPLICATION

This application claims the priority of U.S. Provisional Patent Application No. 63/029,470, filed on May 23, 2020, the entire contents of which are incorporated herein by reference.

TECHNICAL FIELD

The present disclosure relates to the technical field of image processing and, in particular, to a device and method for alignment of multi-modal clinical images using joint synthesis, segmentation, and registration.

BACKGROUND

Image registration attempts to discover a spatial transformation between a pair of images that registers the points in one of the images to the homologous points in the other image, and thus aligning the pair of images. Within medical imaging, registration often focuses on inter-patient/inter-study mono-modal alignment. Another important frequent focal point is multi-channel imaging, e.g., dynamic-contrast computed tomography (CT), multi-parametric magnetic resonance imaging (MRI), or positron emission tomography (PET) combined with CT/MRI. In this setting, the needs of intra-patient multi-modal registration are paramount, given the unavoidable patient movements or displacements between subsequent imaging scans. For scenarios where deformable misalignments are present, e.g., the abdomen, correspondences can be highly complex. Because different modalities provide complementary visual/diagnosis information, proper and precise anatomical alignment benefits the human reader's radiological observation/decision; and is crucial for any downstream computerized analyses. However, finding correspondences between homologous points is usually not trivial because of the complex appearance changes across modalities, which may be conditioned on anatomy, pathology, or other complicated interactions. Therefore, there is a need for developing improved methods for aligning clinical images.

SUMMARY

In one aspect of the present disclosure, an image processing method for performing image alignment is provided. The method includes: acquiring a moving image generated by a first imaging modality; acquiring a fixed image generated by a second imaging modality; jointly optimizing a generator model, a register model, and a segmentor model applied to the moving image and the fixed image according to a plurality of cost functions; and applying a spatial transformation corresponding to the optimized register model to the moving image to align the moving image to the fixed image; wherein: the generator model generates a synthesized image from the moving image conditioned on the fixed image; the register model estimates the spatial transformation to align the synthesized image to the fixed image; and the segmentor model estimates segmentation maps of the moving image, the fixed image, and the synthesized image.

According to certain embodiments of the image processing method, jointly optimizing the generator model, the register model, and the segmentor model includes: performing supervised learning of the segmentor model using an image dataset with ground-truth segmentation maps; and performing unsupervised learning of the generator model, the register model, and the segmentor model using the moving image generated by the first imaging modality and the fixed image generated by the second imaging modality.

According to certain embodiments of the image processing method, performing the unsupervised learning of the generator model, the register model, and the segmentor model includes: jointly learning the generator model and register model according to a first objective function; and jointly learning the generator model, the register model, and segmentor model according to a weighted sum of the first objective function and a second objective function.

According to certain embodiments, the image alignment method further includes: generating the first objective function as a sum of a first regularized cost function for the generator model and a second regularized cost function for the register model.

According to certain embodiments, the image processing method further includes: generating the first regularized cost function for the generator model as a weighted sum of a texture-based generation cost function and a conditional generative adversarial net (GAN) cost function, the texture-based generation cost function accounting for image textual differences, and the conditional GAN cost function conditioned on the fixed image.

According to certain embodiments, the image processing method further includes: generating the second regularized cost function for the register model as a weighted sum of a registration cost function and a smoothness regularization term, the registration cost function accounting for image registration discrepancies, and the smoothness regularization term regularizing a non-realistic spatial transformation.

According to certain embodiments of the image processing method, the registration cost function is calculated as an L1 loss between the warped image based on the moving image and the fixed image.

According to certain embodiments, the image processing method further includes: generating the second objective function as a sum of a joint generation-registration-segmentation cost function and a supervised segmentation cost function, the joint generation-registration-segmentation cost function accounting for constraints between synthesis, registration, and segmentation tasks, and the supervised segmentation cost function accounting for the supervised learning of the segmentor model.

According to certain embodiments of the image processing method, the fixed image is a venous-phase contrast computer tomography (CT) image of a patient; and the moving image is one of: an arterial-phase contrast CT image of the patient, a delay-phase contrast CT image of the patient, or a non-contrast CT image of the patient.

According to certain embodiments of the image processing method, jointly optimizing the generator model, the register model, and the segmentor model includes: optimizing the generator model, the register model, and the segmentor model using a first learning rate for the generator model, a second learning rate for the register model, and a third learning rate for the segmentor model, the third learning rate being greater than the second learning rate, and the second learning rate being greater than the first learning rate.

In another aspect of the present disclosure, an image processing device for performing image alignment is provided. The device includes: a memory, storing computer-executable instructions; and a processor, coupled with the memory and, when the computer-executable instructions being executed, configured to: acquire a moving image generated by a first imaging modality; acquire a fixed image generated by a second imaging modality; jointly optimize a generator model, a register model, and a segmentor model applied to the moving image and the fixed image according to a plurality of cost functions; and apply a spatial transformation corresponding to the optimized register model to the moving image to align the moving image to the fixed image; wherein: the generator model generates a synthesized image from the moving image conditioned on the fixed image; the register model estimates the spatial transformation to align the synthesized image to the fixed image; and the segmentor model estimates segmentation maps of the moving image, the fixed image, and the synthesized image.

According to certain embodiments of the image processing device, the processor is further configured to: perform supervised learning of the segmentor model using an image dataset with ground-truth segmentation maps; and perform unsupervised learning of the generator model, the register model, and the segmentor model using the moving image generated by the first imaging modality and the fixed image generated by the second imaging modality.

According to certain embodiments of the image processing device, the processor is further configured: jointly learn the generator model and register model according to a first objective function; and jointly learn the generator model, the register model, and segmentor model according to a weighted sum of the first objective function and a second objective function.

According to certain embodiments of the image processing device, the processor is further configured to: generate the first objective function as a sum of a first regularized cost function for the generator model and a second regularized cost function for the register model.

According to certain embodiments of the image processing device, the processor is further configured to: generate the first regularized cost function for the generator model as a weighted sum of a texture-based generation cost function and a conditional generative adversarial net (GAN) cost function, the texture-based generation cost function accounting for image textual differences, and the conditional GAN cost function conditioned on the fixed image.

According to certain embodiments of the image processing device, the processor is further configured to perform: generate the second regularized cost function for the register model as a weighted sum of a registration cost function and a smoothness regularization term, the registration cost function accounting for image registration discrepancies, and the smoothness regularization term regularizing a non-realistic spatial transformation.

According to certain embodiments of the image processing device, the registration cost function is calculated as an L1 loss between the warped image based on the moving image and the fixed image.

According to certain embodiments of the image processing device, the processor is further configured to: generate the second objective function as a sum of a joint generation-registration-segmentation cost function and a supervised segmentation cost function, the joint generation-registration-segmentation cost function accounting for constraints between synthesis, registration, and segmentation tasks, and the supervised segmentation cost function accounting for the supervised learning of the segmentor model.

In another aspect of the present disclosure, a non-transitory computer-readable storage medium storing a plurality of instructions is provided. When the plurality of instructions are executed by a processor, they cause the processor to: acquire a moving image generated by a first imaging modality; acquire a fixed image generated by a second imaging modality; jointly optimize a generator model, a register model, and a segmentor model applied to the moving image and the fixed image according to a plurality of cost functions; and apply a spatial transformation corresponding to the optimized register model to the moving image to align the moving image to the fixed image; wherein: the generator model generates a synthesized image from the moving image conditioned on the fixed image; the register model estimates the spatial transformation to align the synthesized image to the fixed image; and the segmentor model estimates segmentation maps of the moving image, the fixed image, and the synthesized image.

According to certain embodiments of non-transitory computer-readable storage medium, the plurality of instructions further cause the processor to: perform supervised learning of the segmentor model using an image dataset with ground-truth segmentation maps; and perform unsupervised learning of the generator model, the register model, and the segmentor model using the moving image generated by the first imaging modality and the fixed image generated by the second imaging modality.

BRIEF DESCRIPTION OF THE DRAWINGS

In order to more clearly illustrate the technical solutions according to the embodiments of the present disclosure, the drawings used in the description of the embodiments will be briefly described below. The drawings in the following description are only some embodiments of the present disclosure. Other drawings may be obtained by those of ordinary skill in the art based on these drawings.

FIG. 4 illustrates an embodiment of the JSSR process;

DETAILED DESCRIPTION

Figure 1:
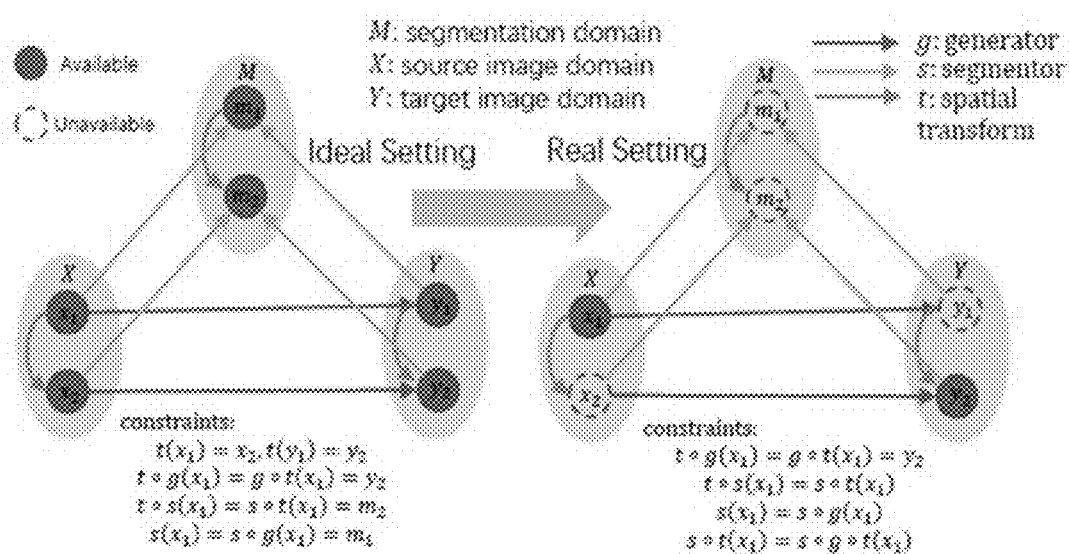
FIG. 1 illustrates relationships between synthesis, segmentation, and registration tasks.

The technical solutions according to the embodiments of the present disclosure are described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

Multi-modal registration remains a challenging task, particularly since ground-truth deformations are hard or impossible to obtain. Methods must instead learn transformations or losses that allow for easier correspondences between images. Unsupervised registration methods often use a local modality invariant feature to measure similarity. However, these low-level features may not be universally applicable and cannot always capture high-level semantic information. Other approaches use generative models to reduce the domain shift between modalities, and then apply registration based on direct intensity similarity. A different strategy learns registrations that maximize the overlap in segmentation labels. The latter approach is promising, as it treats the registration process similar to a segmentation task, aligning images based on their semantic category. Yet, these approaches rely on having supervised segmentation labels in the first place for every deployment scenario.

Multi-modal image registration has been widely studied and applied in the medical area. The existing registration methods can be based on additional information like landmarks and surface, or based on the voxel property, which operate directly on the image grey values without prior data introduced by the user or segmentation. For the voxel-based methods, there are two typical strategies. One is to make use of a self-similarity measurement that does not require the cross-modal feature like the Local Self-Similarities (LSS). Certain works introduced a modality independent neighborhood descriptor (MIND) which may effectively measure the cross-modal differences. Certain works employed a discrete dense displacement sampling for the deformable registration with a self-similarity context (SSC). The other strategy is to map both modalities into a shared space and measure the mono-modal difference. Certain works introduced Mutual Information (MI) based on information theory that can be applied directly to cross-modal images as a similarity measure, followed up by other works with Normalized Mutual Information (NMI). However, such methods suffer from shortcomings such as the low convergence rate and loss of spatial information. Certain works employed a convolutional neural network (CNN) to learn interpretable modality invariant features with a small amount of supervision data. Certain works utilized Haar-like features from paired multi-modality images to fit a Patch-wise Random Forest (P-RF) regression for bi-directional image synthesis, and certain works applied CycleGANs to reduce the gap between modalities for better alignment.

With the development of deep learning methods in recent years, a variety of learning-based registration methods are proposed. While the ground truth deformation fields are hard to obtain, most of the methods utilized synthesized deformation fields as the supervision for training. Unsupervised methods may use CNN with a spatial transformation function. These unsupervised methods may mainly focus on mono-modal image registration. Some other methods make use of correspondence between labeled anatomical structures as a weakly supervision to help the registration procedure. Certain works also showed how the segmentation map can help registration. However, in most cases, the segmentation map is not available, which motivates us to combine the registration and segmentation component.

As the registration, synthesis, segmentation tasks are all related to each other, there are already a variety of works that explore the advantages of combine different tasks together. Certain works used cycle-consistent adversarial networks (CycleGANs) to synthesize multi-modal images into mono-modal and apply mono-modal registration methods. Certain works projected multi-modal images into shared feature space and register based on the feature. Certain works made use of a generative model to disentangle the appearance space from the shape space. Certain works combined a segmentation model and a registration model to let them benefit each other but focus on mono-modal registration. Certain works performed supervised multi-phase segmentation based on paired multi-phase images but not jointly trained the registration and segmentation. Certain works used the generative model to help guide the segmentation model.

Both the synthesis and segmentation approaches are promising, but they are each limited when used alone, especially when fully-supervised training data is not available, i.e., no paired multi-modal images and segmentation labels, respectively. FIG. 1 illustrates relationships between the synthesis, segmentation, and registration tasks. As shown in FIG. 1, the synthesis, segmentation, and registration tasks are linked together and define implicit constraints between each other. The constraints should hold in both ideal and real settings. In the ideal setting, spatially transformed examples from each domain, and their segmentation labels, are fully available. In more realistic settings, only one example is available from each domain, each under a different spatial transform. Moreover, segmentation labels are not available. Should segmentation, synthesis, and spatial transform mappings be available, the constraints in the ideal case can be mapped to analogous constraints in the real case.

Motivated in part by the links between the synthesis, segmentation, and registration tasks, the present disclosure provides a device and a method for aligning multi-modal clinical images using a joint synthesis, segmentation, and registration (JSSR) process that satisfies the implicit constraints as shown in FIG. 1. The JSSR process may combine all three of the tasks to tackle the multi-modal registration problem in the most general setting where the deformation ground truth, paired multi-modal images and segmentation maps are all unavailable. The JSSR process may include a generator, a segmentor, and a register and may perform all three synthesis, segmentation, and registration tasks simultaneously. Given a fixed image and moving image from different modalities for registration, the generator may synthesize the moving image to the same modality of the fixed image, conditioned on the fixed image to better reduce the domain gap. Then the register may take the synthesized image from the generator and the fixed image to estimate the deformation field. Last, the segmentor may estimate the segmentation map for the moving image, fixed image, and synthesized image. During a training procedure, the JSSR system may optimize for several consistency losses including the similarity between the fixed image and the warped synthesized image, the similarity between the segmentation maps of the warped moving image and the fixed image, together with an adversarial loss for generating high fidelity images and smoothness loss to regularize the deformation field. According to certain embodiments, to avoid the segmentor from providing a meaningless segmentation map, some data with segmentation annotation may be added to regularize the segmentor.

Figure 2:
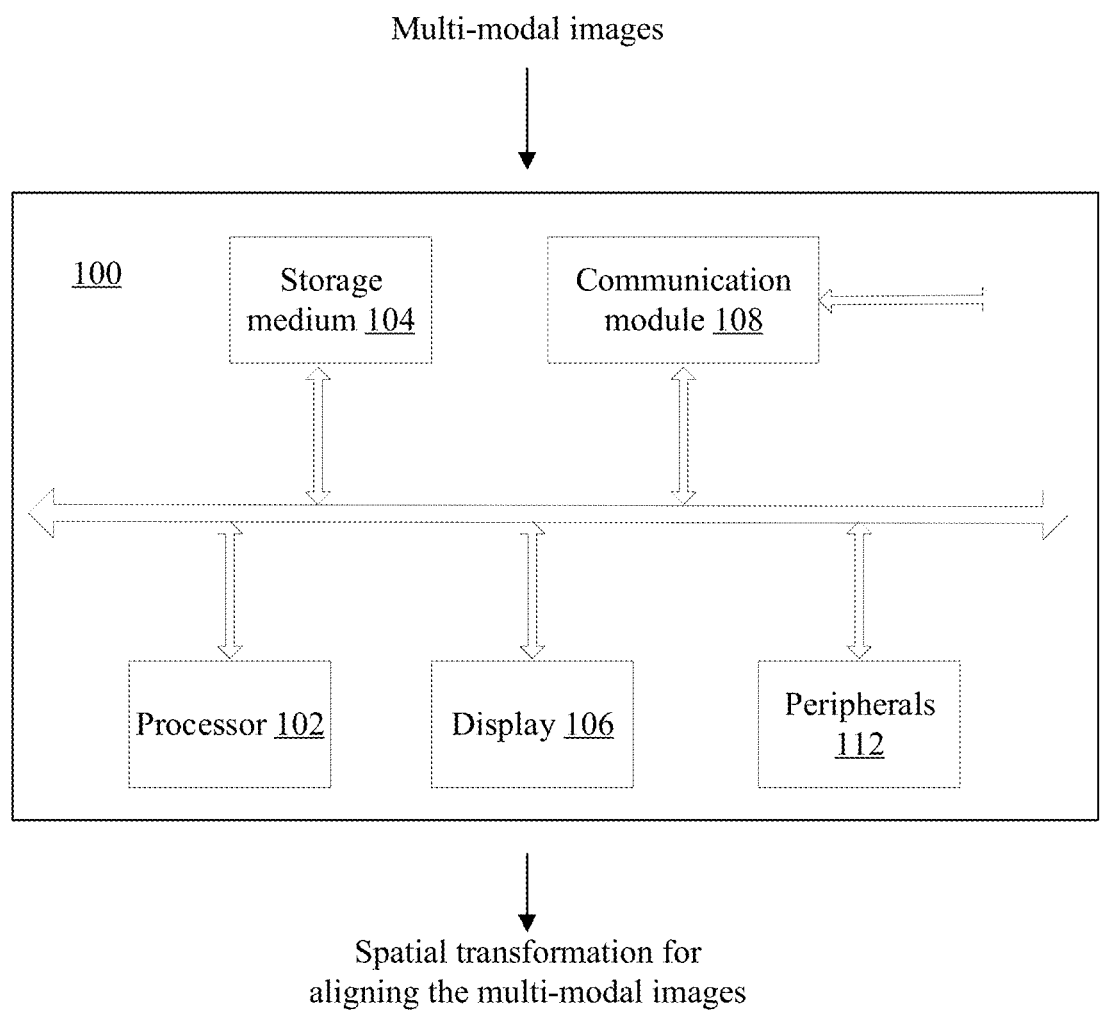
FIG. 2 illustrates an image processing device for aligning multi-modal clinical images using a joint synthesis, segmentation, and registration (JSSR) process according to certain embodiments of the present disclosure.

FIG. 2 illustrates an image processing device 100 for aligning multi-modal clinical images using the JSSR process. As shown in FIG. 2, the image processing device 100 may be configured to receive multi-modal clinical images of a patient. In certain embodiments, received multi-modal clinical images may be three-dimensional (3D) clinical images acquired from two or more different modalities. In certain embodiments, the multi-modal clinical images may include a moving image generated by a first imaging modality and a fixed image generated by a second imaging modality. According to certain embodiments, the multiple modalities may include multiple image channels of an imaging system, such as multiple phases of dynamic-contrast computed tomography (CT) system, multi-parametric imaging of a magnetic resonance imaging (MRI) system, or positron emission tomography (PET) data sets combined with CT and/or MRI. The multi-modal clinical images may be obtained from one or more imaging instruments, loaded from a memory module, or otherwise provided to the image processing device 100. The image processing device 100 may be configured to perform neural-network processing to align the received multi-modal clinical images using the JSSR process.

In certain embodiments, the image processing device 100 may output a spatial transformation for aligning the multi-modal images. In certain embodiments, the image processing device 100 may apply the spatial transformation to the inputted moving image generated by the first imaging modality to align (or register) the moving image to the fixed image generated by the second imaging modality. In certain embodiments, the spatial transformation may correspond to a register model optimized jointly with a generator model and a segmentor model using the JSSR process.

In some embodiments, the Image processing device 100 may be a computing device including a processor 102 and a storage medium 104. The Image processing device 100 may further include a display 106, a communication module 108, and additional peripheral devices 112. Certain devices may be omitted, and other devices may be included. Processor 102 may include any appropriate processor (s). In certain embodiments, processor 102 may include multiple cores for multi-thread or parallel processing. Processor 102 may execute sequences of computer program instructions to perform various processes, such as a neural network processing program. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs and instructions for implementing various processes, when executed by processor 102, cause the processor to perform various steps of the neural network processing program of an image processing method for detecting and locating anatomical abnormalities from a medical image. The communication module 108 may include network devices for establishing connections through a network. Display 106 may include any appropriate type of computer display device or electronic device display (e.g., CRT or LCD based devices, touch screens). Peripherals 112 may include additional I/O devices, such as a keyboard, a mouse, and so on. The processor 102 may be configured to execute instructions stored on the storage medium 104 and perform various operations related to the image processing method as detailed in the following descriptions.

Figure 3:
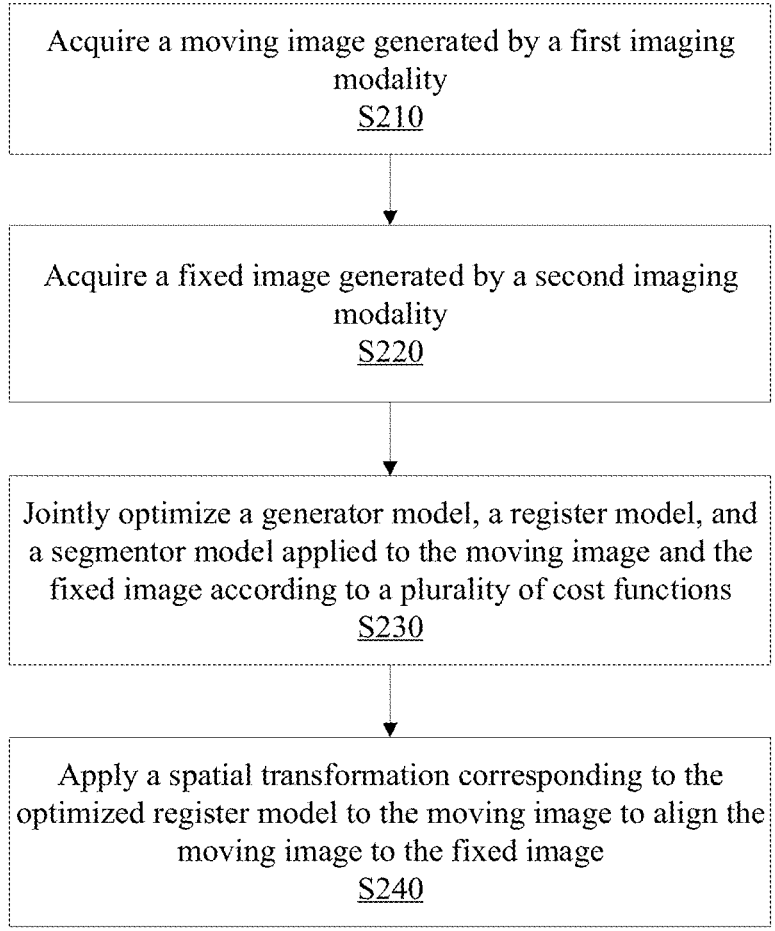
FIG. 3 illustrates an image processing method for performing alignment of multi-modal clinical images using the JSSR process according to certain embodiments of the present disclosure.

FIG. 3 illustrates an image processing method 200 for performing alignment of multi-modal clinical images using the JSSR process. As shown in FIG. 3, the image processing method 200 may include the following exemplary steps.

Step S210 is to acquire a moving image generated by a first imaging modality. According to certain embodiments, the moving image may be generated at time point A for a subject or a scene. The subject or the scene may experience a relative movement at the time point A compared to at another time point B. In certain embodiments, the relative movement may include one or more of: a positional change or a shape deformation. For example, when a patient takes multiple medical imaging scans at different time points, patient movements between different scans are usually unavoidable. In certain scenarios, for example, when imaging the abdomen, relative shape deformation is present between different scans.

According to certain embodiments, the first imaging modality may refer to an imaging process using a specific type of imaging system or device. For example, the type of imaging or device may be a CT imaging system, an MM system, a PET imaging system, an ultrasound imaging system, an optical imaging system, and so on. According to certain other embodiments, the first imaging modality may refer to a specific imaging process or an imaging phase using an imaging system or device. For example, the moving image may be one of: an arterial-phase contrast CT image, a delay-phase contrast CT image, or a non-contrast CT image of the patient. The second imaging modality may refer to an imaging process or imaging phase different from the first imaging modality. For example, the fixed image may be a venous-phase contrast CT image.

Step S220 is to acquire a fixed image generated by a second imaging modality. According to certain embodiments, when the moving image is generated at a first time point for a subject of a scene, the fixed image may be generated for the same subject or scene at a second time point, where the second time point may be different from the first time point. The subject or the scene may experience a relative movement between the moving image and the fixed image. According to certain embodiments, the second imaging modality may be different from the first image modality. For example, in certain embodiments, the moving image may be generated by a specific type of imaging system or device, such as a CT imaging system, and the fixed image may be generated by another type of imaging system or device, such as an MM system. In other embodiments, the moving image and the fixed image may be generated by different imaging channels or phases using a same imaging system or device. For example, the fixed image may be a venous-phase CT image of a patient, and the moving image is one of: an arterial-phase contrast CT image, a delay-phase contrast CT image, or a non-contrast CT image of the patient.

Step S230 is to jointly optimize a generator model, a register model, and a segmentor model applied to the moving image and the fixed image according to a plurality of cost functions. According to certain embodiments, Step S230 may implement the JSSR process to jointly optimize the generator model, the register model, and the segmentor model. The generator model generates a synthesized image from the moving image conditioned on the fixed image; the register model estimates the spatial transformation to align the synthesized image to the fixed image; and the segmentor model estimates segmentation maps of the moving image, the fixed image, and the synthesized image.

FIG. 4 illustrates an embodiment of the JSSR process S230. As shown in FIG. 4, the JSSR process S230 may include the following exemplary steps.

Step S232 is to perform supervised learning of the segmentor model using an image dataset with ground-truth segmentation maps. According to certain embodiments, in order to incorporate meaningful semantic information in the segmentor model, additional image data with segmentation annotation is used to train the segmentor model. The supervised learning of the segmentor model may provide a meaningful initial state for the segmentor model in the following steps of unsupervised learning.

Step S234 is to perform unsupervised joint learning of the generator model and register model according to a first objective function. According to certain embodiments, the first objective function may be a sum of a first regularized cost function for the generator model and a second regularized cost function for the register model. According to certain embodiments, the first regularized cost function for the generator model may have a form of a weighted sum of a texture-based generation cost function and a conditional generative adversarial net (GAN) cost function. The texture-based generation cost function may account for image textual differences. The conditional GAN cost function may be conditioned on the fixed image. According to certain embodiments, the second regularized cost function for the register model may have a form of a weighted sum of a registration cost function and a smoothness regularization term. The registration cost function may account for image registration discrepancies. The smoothness regularization term may regularize a non-realistic spatial transformation. According to certain embodiments, the registration cost function may be calculated as an L1 loss between the warped image based on the moving image and the fixed image.

Step S236 is to perform unsupervised joint learning of the generator model, the register model, and the segmentor model according to a weighted sum of the first objective function and a second objective function. According to certain embodiments, the second objective function may have a form of a sum of a joint generation-registration-segmentation cost function and a supervised segmentation cost function. The joint generation-registration-segmentation cost function may account for constraints between synthesis, registration, and segmentation tasks. The supervised segmentation cost function may account for the supervised learning of the segmentor model.

Referring back to FIG. 3, after the JSSR process, Step S240 is to apply a spatial transformation corresponding to the optimized register model to the moving image to align the moving image to the fixed image. According to certain embodiments, the optimized register model provides a spatial transformation. The spatial transformation may correspond to a deformation field that aligns the moving image with the fixed image.

Figure 5:
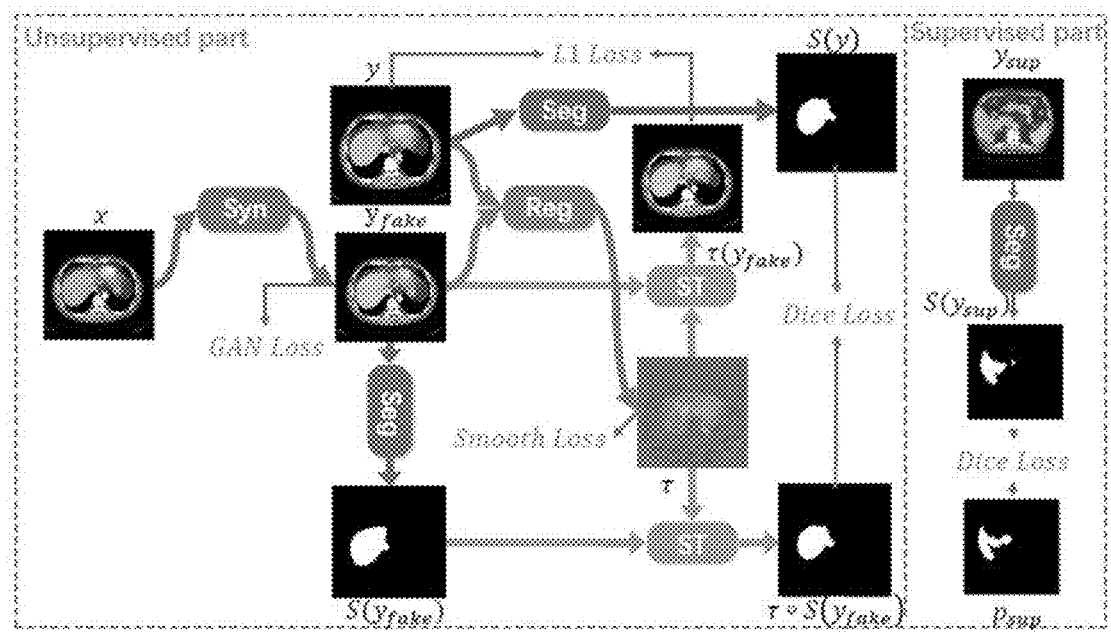
FIG. 5. illustrates an overall framework of the JSSR process according to certain embodiments of the present disclosure.

An example of implementing the image processing method 200 is described below. FIGS. 1 and 5 illustrate a framework of the JSSR process according to certain embodiments.

Given the moving image $x \in \chi$ and fixed image $y \in \mathcal{Y}$ from different modalities, the goal is to find a spatial transformation function $\tau$ that optimizes the similarity between y and $\tau(x)$. In a common application scene, none of the deformation fields ground truth, segmentation maps, or paired multi-modal images are available. Therefore, the multi-modal image registration problem needs to be solved in a fully unsupervised way to meet the problem setting.

Motivated by the relationship between image synthesis, segmentation, and registration, the JSSR process is developed and includes three components: a generator G, a register $\Phi$, and a segmentor S. The constraints shown in FIG. 1 need to be optimized since they are the necessary conditions for a correct joint system. By putting them together, the system is also capable of doing unpaired image synthesis and multi-modal image segmentation. During optimization, these three tasks will benefit from each other, leading to improvement for all three tasks. FIG. 5 illustrates an overall framework of the JSSR process.

For the generator model for image synthesis, although there are already works solving unpaired image synthesis like in, existing synthesis methods generate a variety of different target domain images based on random sampling. However, in the registration model, the synthesized images are supposed to have the same texture properties conditioned on the fixed images to help registration, making the paired image synthesis method a better choice. In a problem layout, we have $x \in \chi$ and $y \in \mathcal{Y}$ as the moving and fixed images, where X and $\mathcal{Y}$ represent image sets from different modalities. The JSSR process may use a conditional GAN with a generative model G to learn a mapping from x, y to $\tau^{-1}(y)$, G: $\{x, y\} \rightarrow \tau^{-1}(y)$. Here $\tau$ represents the ground truth spatial transformation (also known as the deformation field) that is being estimated. $\tau^{-1}$ is the inverse mapping of $\tau$. Note that $\tau$ is absent in image synthesis. Here it is used for convenience's sake. A discriminator D is equipped to detect the fake images from the generator. The objective of the conditional GAN is $$\mathcal{L}_{GAN}(G,D) = E_y \log D(y) - E_{x,y} \log D(G(x,y)). \quad (1)$$

In classical GAN's setting, the term $E_y \log D(\tau^{-1}(y))$ is supposed to be used instead of $E_y \log D(y)$. However, based on the assumption that spatial transformation function $\tau$ doesn't change image texture, $\tau^{-1}(y)$ is replaced with y in the first term of (1). Another texture-based loss may be added to benefit the GAN objective:

$$\mathcal{L}_{L1}^{syn}(G) = E_{x,y} \|\tau^{-1}(y) - G(x,y)\|_1. \quad (2)$$

The final objective for the synthesis may be calculated as:

$$G^* = \arg\min_G \max_D \mathcal{L}_{L1}^{syn}(G) + \lambda_{syn} \mathcal{L}_{GAN}(G, D). \quad (3)$$

However, the objective may only be optimized giving $\tau$ for each x, y, which can be introduced after combining the registration part.

In multi-modal image registration, for the two images x, y, the register model aims to learn a function $\Phi$: x, y $\rightarrow \tau$ where $\tau$ is the spatial transformation (or the deformation field), so that it warps moving image x to be as similar as the fixed image y as possible. For mono-modal registration, $L_1$ loss may be used to measure the similarity between the fixed image and the warped image. For two images from different modalities, certain works proposed to use a cross-modal similarity measure such as cross-correlation. According to certain embodiments of the present disclosure, the JSSR process utilizes a generative model to transfer x into y domain so that mono-modal similarity measures may be used. The objective for registration may be calculated as:

$$\mathcal{L}_{L1}^{reg}(\Phi)=E_{x,y}\|\tau(G(x,y))-y\|_1, \qquad (4)$$

where $\tau=\Phi(G(x, y),y)$, and G is the generator that synthesizes images from X to $\mathcal{Y}$. Another smoothness term may be added to prevent from non-realistic deformation field:

$$\mathcal{L}_{smooth}(\Phi)=E_{x,y}\Sigma_{v\in\Omega}\|\nabla\tau_v\|^2, \qquad (5)$$

where v represents the location of voxel and $\nabla\tau_v$ calculates the differences between neighboring voxels of v. The final objective for the registration may be calculated as:

$$\Phi^* = \underset{\Phi}{\operatorname{argmin}} \mathcal{L}_{L1}^{reg}(\Phi) + \lambda_{reg}\mathcal{L}_{smooth}(\Phi) \qquad (6)$$

Similarly, the objective in Eq. (1) cannot be calculated without giving G. However, in order to have an accurate estimation of G, an accurate estimation of $\Phi$ is needed. According to certain embodiments, the JSSR process adopts the approach of adding the two objectives from the synthesis part and registration part together, which leads to:

$$\begin{aligned}\Phi^*, G^* &= \underset{\Phi,G}{\operatorname{argmin}} \mathbb{F}(\Phi, G) \\ &= \underset{\Phi,G}{\operatorname{argmin}} \max_{D} \mathcal{L}_{L1}^{reg}(\Phi, G) + \mathcal{L}_{L1}^{syn}(\Phi, G) + \\ &\quad \lambda_{reg}\mathcal{L}_{smooth}(\Phi, G) + \lambda_{syn}\mathcal{L}_{GAN}(G, D) \\ &\approx \underset{\Phi,G}{\operatorname{argmin}} \max_{D} 2\mathcal{L}_{L1}^{reg}(\Phi, G) + \\ &\quad \lambda_{reg}\mathcal{L}_{smooth}(\Phi, G) + \lambda_{syn}\mathcal{L}_{GAN}(G, D).\end{aligned} \qquad (7)$$

The $\tau^{-1}$ in $\mathcal{L}_{L1}^{syn}$ is not trivial to calculate but it may be proved that $\mathcal{L}_{L1}^{syn}$ and $\mathcal{L}_{L1}^{reg}$ are close to each other when $\tau$ is smooth enough, the two terms may be merged without changing too much for the objective. Specifically, it may be proved that $\mathcal{L}_{L1}^{syn}(\Phi,G) \leq k\mathcal{L}_{L1}^{reg}(\Phi,G)$ for some constant k when the $\tau$ generated by $\Phi$ is smooth enough, as:

$$\begin{aligned}\|\tau^{-1}(y) - G(x, y)\|_1 &= \int_\Omega |\tau^{-1}(y)_i - G(x, y)_i| di \\ &= \int_\Omega |y_{\tau(i)} - G(x, y)_i| di \\ &= \int_\Omega |y_j - G(x, y)_{\tau^{-1}(j)}| d\tau^{-1}(j) \\ &= \int_\Omega |(y)_j - \tau(G(x, y))_j| |\tau^{-1\prime}(j)| dj \\ &\leq k \int_\Omega |(y)_j - \tau(G(x, y))_j| dj \\ &= k\|\tau(G(x, y)) - y\|_1\end{aligned}$$

using the smoothness assumption that $|\tau^{-1\prime}(j)| \leq k \forall j$, x, y and the identity transform $\tau(y)_i = y_{\tau^{-1}(i)}$. Then we have $$\mathcal{L}_{L1}^{syn}(\Phi,G)=E_{x,y}\|\tau^{-1}(y)-G(x,y)\|_1 \leq kE_{x,y}\|\tau(G(x,y))-y\|_1=k\mathcal{L}_{L1}^{reg}(\Phi,G).$$

Figure 6:
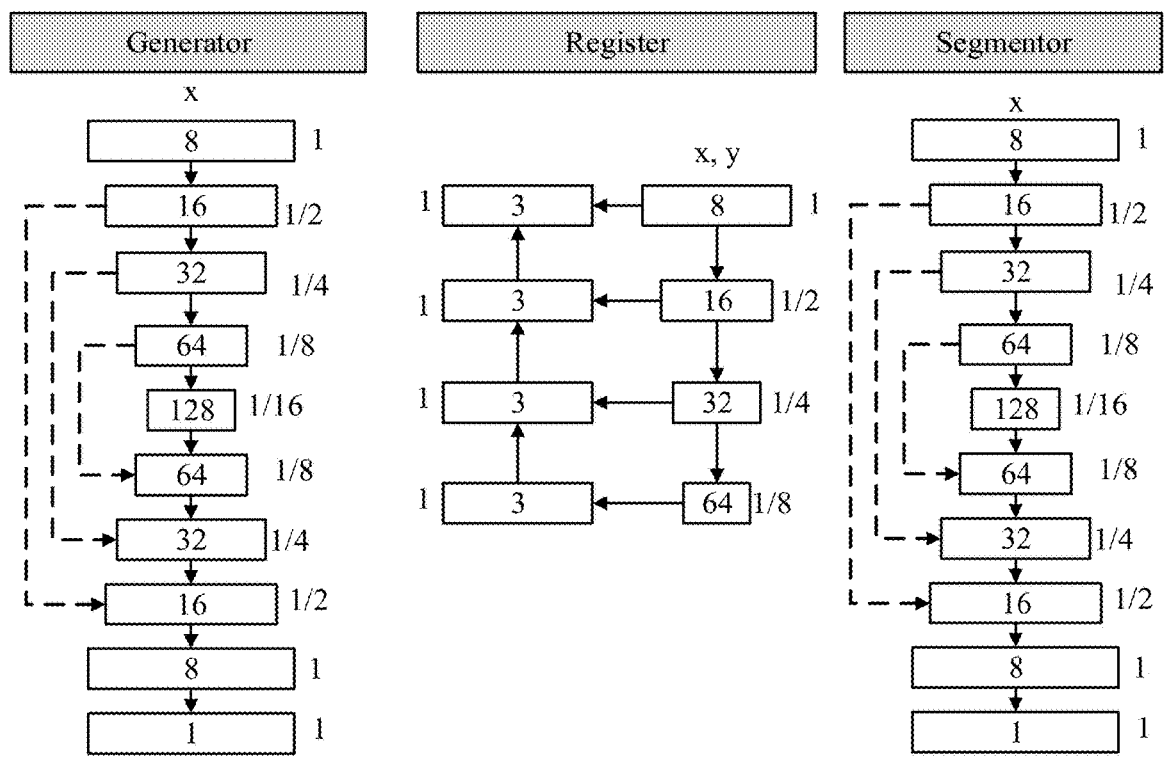
FIG. 6 illustrates a network structure for each of the generator model, the register model, and the segmentor model according to certain embodiments of the present disclosure.

However, there is no guarantee that an optimal solution may be obtained by minimizing $\mathbb{F}(\Phi,G)$. In fact, there is a trivial solution that minimizes $\mathbb{F}(\Phi,G)$, which is when $G(x, y)=y$ and $\Phi(G(x, y), y)=\Phi(y, y)=I$. In order to avoid getting a trivial solution, a skip connection may be added from the source domain to keep the spatial information in the network structure of the generator. This process is shown in FIG. 6, which illustrates a network structure for each of the generator model, the register model, and the segmentor model according to certain embodiments, and the dash-line connections illustrate the skip connections. As shown in FIG. 6, according to certain embodiments, the register model may adopt a PHNN network structure, and the generator model and the segmentor model may adopt a V-Net structure.

Regarding the segmentor model, the segmentor is used for two considerations. Firstly, additional information about a segmentation map may help guide the registration process. Thus, additional segmentation models may be used to provide segmentation map information as the manual annotation is not available. Secondly, as shown in certain works, the synthesis and registration procedures may benefit the segmentor model by providing auxiliary information, which may facilitate developing a better segmentor model on a dataset without annotation.

Denote the segmentor model as a function $S:x \rightarrow p$, where $p \in \mathcal{P}$ represents for the segmentation map domain. Based on the constraints between synthesis, registration, and segmentation tasks, the objective of the joint generation-registration-segmentation models may be calculated as:

$$\mathcal{L}_{dice}^{reg}(S,\Phi,G)=E_{x,y}1-\text{Dice}[\tau(S(G(x,y))),S(y)], \qquad (8)$$

where $\tau=\Phi(G(x, y),y)$ and $$\text{Dice}(x, y) = \frac{2x^T y}{x^T x + y^T y}$$

is the measurement for the similarity between two binary volume x, y, which is widely used in medical image segmentation. This loss term connects three components, including the generator, the register, and the segmentor, and provides the main performance improvement for the system.

To make the consistency term to work properly, the estimation for the segmentor needs to be accurate enough. However, with only the consistency loss, the segmentor may not be able to learn meaningful semantic information. A segmentor that generates volumes of all backgrounds can also optimize the consistency loss. To avoid this, according to certain embodiments, extra data with segmentation annotation is added in one modality as a supervision to provide with the segmentor a meaningful initial state. The supervision loss may be calculated as:

$$\mathcal{L}_{dice}^{sup}(S)=E_{y_{sup}}1-\text{Dice}[S(y_{sup}),p_{sup})], \qquad (9)$$

where $y_{sup} \in \mathcal{Y}_{sup}$ is in the same modality with $y \in \mathcal{Y}$ but do not overlap. $p_{sup} \in \mathcal{P}_{sup}$ is the corresponding annotation. Then the final regularization term provided by the segmentor may be calculated as:

$$\mathbb{H}(S,\Phi,G)=\mathcal{L}_{dice}^{reg}(S,\Phi,G)+\mathcal{L}_{dice}^{sup}(S) \qquad (10)$$

For joint optimization, based on the foregoing analysis, the final objective for the entire JSSR process may be calculated as:

$$\Phi^*, G^*, S^* = \arg\min_{\Phi,G,S} \mathbb{F}(\Phi, G) + \lambda_{seg}\mathbb{H}(S, \Phi, G). \qquad (11)$$

In order to provide all the components with a good initial point, the JSSR process may first train S on the data with supervision, then $\Phi$ and G may be learned using Eq. (7) on the unsupervised data. Finally, the JSSR process may jointly learn all the components using Eq. (11). During optimization in (7) and (11), a classic alternate process may be used for training the GAN model, which fixes $\Phi$, G, S and optimize for D and then fixes D and optimize for the other components, and then alternates the processes.

In the following examples, various aspects of the image processing method according to FIGS. 1 and 3-6 are implemented using available datasets to demonstrate the efficacy of the image processing method. The main experiments are conducted on a large-scale dataset of 3D dynamic contrast multi-phase liver CT scans, extracted from the archives of the Chang Gung Memorial Hospital (CGMH) in Taiwan. The dataset contains CT scans from 1485 patients and for each patient, there are image volumes of four different intravenous contrast phases: i.e., venous, arterial, delay, and non-contrast phases. The studied patient population is composed of patients with liver tumors undergoing CT imaging examinations for interventional biopsy. The end goal is to develop a computer-aided diagnosis (CAD) system to identify the pathological subtype of any given liver tumor. For both human readers and computers, all phases of 3D CT images per patient need to be pre-registered precisely to facilitate the downstream diagnosis process by observing and judging the visually dynamic contrast-changing patterns of liver tumor tissues in the sequential order of non-contrast, arterial, venous, and delay CTs.

The different phases are obtained from the CT scanner at different time points after the contrast media injection. The images of different phases display different information according to the distribution of contrast media in the human body. The intensity value of each voxel in the CT image, measured by the Hounsfield Unit (HU), is an integer ranging from 1000 HU to 1000 HU, which may also be affected by the density of contrast media. The volume size of the CT image is 512×512×L, where L depends on the physical coordinate of the start point for scanning the CT and the resolution along the axial axis, which is 5 mm in the dataset. Since the venous phase usually contains most of the information for the diagnosis, the venous phase is chosen as the anchor phase (fixed images) and images from the other three phases are synthesized and registered to the venous phase images. The experimental design divides the dataset into 1350/45/90 patients for training, validation, and testing, and having the liver segmentation annotated on the validation and testing set for evaluation. Note that there are a total of 1485×4=5940 3D CT scans (all contain pathological livers) used in the experiments. To the best of our knowledge, this is the largest clinically realistic study of this kind to-date. For the supervised part, we choose a public dataset MSD that contains 131 CT images of the venous phase with voxel-wise annotation of the liver and divide it into 100/31 for training and validation. The experimental design evaluates for all the registration, synthesis, and segmentation tasks to show how joint training can improve for each task.

The experimental design compares with the baseline for all the image synthesis, image registration, and image segmentation tasks, including the following:

For image synthesis, the experimental design chooses Pix2Pix using both reconstruction loss and cGAN loss.

For image registration, the experimental design first compares with Deeds, the conventional state-of-the-art multi-modal registration method. The advantage of a learning-based method compared with the conventional method is usually on the speed of inference, while we can also show the performance improvement. The experimental design also compares with a learning-based method VoxelMorph with local cross-correlation to handle the multi-modal image registration.

For the segmentation task, the experimental design compares with VNet, which is a popular framework in medical image segmentation.

To perform the registration between four different phases, several preprocessing procedures are performed before applying the deformable registration. Firstly, since the CT images from different phases even for the same patient have different volume sizes, we crop the maximum intersection of all four phases based on the physical coordinate to make their size the same. Secondly, we apply rigid registration using a multi-lingual library for medical image registration between the four phases, using the venous phase as the anchor. Thirdly we apply the windowing from 200 HU to 200 HU for each CT image and normalize to 1 to 1, and then resize the CT volume to 256 256 L to fit in the GPU memory. For the public dataset, we sample along the axial axis to make the resolution 5 mm, and then apply the same preprocessing for the intensity value.

TABLE 1

Evaluation for the registration task on the CGMHLiver dataset in terms of Dice score, HD (mm), ASD (mm), and running time(s)

| | Dice↑ | | | HD95↓ | | |
|---|---|---|---|---|---|---|
| | Arterial | Delay | Uncontrast | Arterial | Delay | Uncontrast |
| Initial State | 90.94 (7.52) | 90.52 (8.08) | 90.08 (6.74) | 7.54 (4.89) | 7.86 (5.83) | 7.87 (4.37) |
| Affine | 92.01 (6.57) | 91.69 (6.80) | 91.52 (5.48) | 6.81 (4.83) | 6.95 (5.32) | 6.73 (3.63) |
| Deeds | 94.73 (2.10) | 94.70 (1.91) | 94.73 (1.90) | 4.74 (1.96) | 4.76 (1.69) | 4.62 (1.05) |
| VoxelMorph | 94.28 (2.53) | 94.23 (3.15) | 93.93 (2.58) | 5.29 (2.33) | 5.42 (3.25) | 5.40 (2.48) |
| JSynR-Reg | 94.81 (2.35) | 94.71 (2.62) | 94.57 (2.52) | 4.93 (2.14) | 5.07 (3.06) | 4.87 (2.30) |
| JSegR-Reg | 95.52 (1.76) | 95.39 (2.14) | 95.37 (1.80) | 4.47 (2.21) | 4.70 (3.24) | 4.45 (1.85) |
| JSSR-Reg | 95.56 (1.70) | 95.42 (2.00) | 95.41 (1.72) | 4.44 (2.19) | 4.65 (3.14) | 4.35 (1.60) |

| | ASD↓ | | | Time↓ | | |
|---|---|---|---|---|---|---|
| | Arterial | Delay | Uncontrast | Arterial | Delay | Uncontrast |

TABLE 1-continued

Evaluation for the registration task on the CGMHLiver dataset
in terms of Dice score, HD (mm), ASD (mm), and running time(s)

| Initial State | 2.12 (1.86) | 2.27 (2.19) | 2.37 (1.77) | —/— | —/— | —/— |
|---|---|---|---|---|---|---|
| Affine | 1.74 (1.58) | 1.86 (1.89) | 1.87 (1.41) | —/7.77 | —/7.77 | —/7.77 |
| Deeds | 1.01 (0.44) | 1.01 (0.39) | 0.99 (0.36) | —/41.51 | —/41.51 | —/41.51 |
| VoxelMorph | 1.10 (0.53) | 1.12 (0.87) | 1.20 (0.67) | 1.71/1.76 | 1.71/1.76 | 1.71/1.76 |
| JSynR-Reg | 0.95 (0.45) | 0.98 (0.72) | 0.98 (0.56) | 3.14/1.76 | 3.14/1.76 | 3.14/1.76 |
| JSegR-Reg | 0.80 (0.37) | 0.83 (0.59) | 0.83 (0.40) | 3.14/1.76 | 3.14/1.76 | 3.14/1.76 |
| JSSR-Reg | 0.79 (0.36) | 0.83 (0.56) | 0.82 (0.37) | 1.71/1.76 | 1.71/1.76 | 1.71/1.76 |

For optimizing the objective, we use the Adam solver for all the components. We set the hyperparameters to be $\lambda_{seg}=\lambda_{reg}=1$, $\lambda_{syn}=0.02$. We choose different learning rates for the different components in order to better balance the training. We use 0.0001 for the generator, 0.001 for the register, 0.1 for the segmentor, and the discriminator. Another way to balance the training is to adjust the weight of different loss terms. However, there are loss terms that relate to multiple components, which makes it more complex to control each component separately. We train on the Nvidia Quadro RTX 6000 GPU with 24 GB memory, with the instance normalization and batch size 1. The training process takes about 1.4 GPU days.

Figure 7:
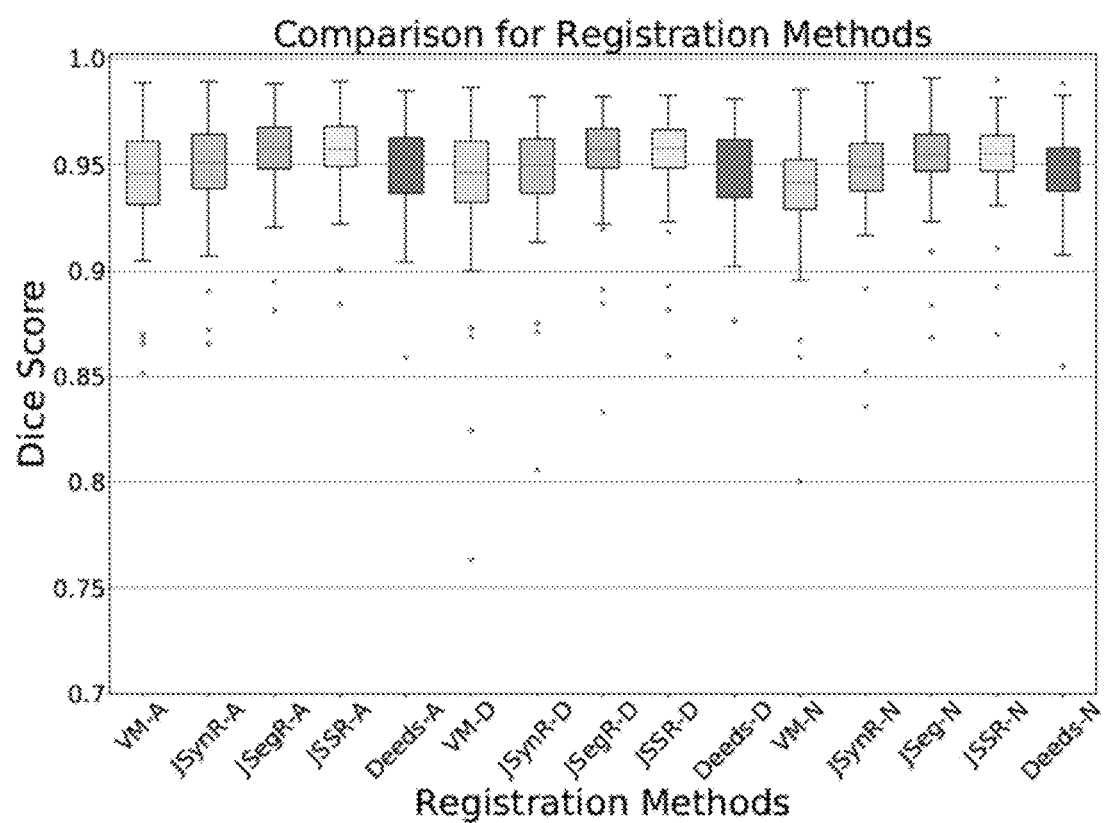
FIG. 7 illustrates a performance comparison for different methods on computer tomography (CT) images with three phases.

The results of the registration task are summarized in Table 1. The methods are evaluated by the similarity between the segmentation map of the fixed image, which is always in the venous phase here, and the warped segmentation map of the moving image chosen from arterial, delay, and non-contrast. The similarity is measured in the Dice score, 95 percent Hausdorff distance (HD), and average surface distance (ASD). We report the average number followed by the standard deviation on the testing set for each measurement. We also report the consumed time on GPU/CPU in sec for each method. In Table 1, we refer Initial State to the result before applying any registration, and Affine to the result after rigid registration. We also compare with the conventional method Deeds and learning-based method VoxelMorph. We term our joint system as JSSR and JSSR-Reg as the registration part of JSSR. We also compare two ablations of JSSR. JSynR, which only contains the generator and register, is optimized using Eq. (7). JSegR has the segmentor and register instead. As shown in Table 1, the JSSR method outperforms Deeds by 0.83% on the average Dice, and at the same time takes the advantage of much faster inference. Also, by taking benefit from joint training, JSSR achieves significantly higher results than VoxelMorph (exceeded by 1.28%) with comparable inference time. We can observe the gradual improvements from VoxelMorph to JSynR to JSSR, which proves the necessity of joint training. Refer to FIG. 7 for more detail of the results, which provides box-plots for the result of registration (Dice Score) on three phases (A for arterial, D for the delay, N for non-contrast) for different methods.

TABLE 2

Evaluation for the synthesis and segmentation tasks on
the CGMHLiver dataset in terms of average Dice score

| Dice↑ | Venous | Arterial | Delay | Uncontrast |
|---|---|---|---|---|
| | | VNet | | |
| Non-Synthesis | 90.47 (6.23) | 89.47 (7.05) | 89.88 (6.38) | 89.38 (6.38) |
| Pix2Pix [13] | 90.47 (6.23) | 76.50 (17.77) | 79.60 (13.13) | 67.48 (15.97) |
| JSynR-Syn | 90.47 (6.23) | 89.69 (7.09) | 90.01 (6.27) | 90.15 (6.21) |
| JSSR-Syn | 90.47 (6.23) | 89.44 (7.15) | 89.76 (6.34) | 89.31 (7.57) |
| | | JSegR-Seg | | |
| Non-Synthesis | 91.88 (4.84) | 90.91 (5.06) | 91.18 (4.68) | 91.12 (4.72) |
| Pix2Pix | 91.88 (4.84) | 89.59 (5.51) | 87.78 (5.78) | 89.59 (5.51) |
| JSynR-Syn | 91.88 (4.84) | 91.15 (4.93) | 91.37 (4.56) | 91.36 (4.54) |
| JSSR-Syn | 91.88 (4.84) | 91.12 (4.99) | 91.30 (4.63) | 91.39 (4.53) |
| | | JSSR-Seg | | |
| Non-Synthesis | 92.24 (3.88) | 91.25 (4.10) | 91.34 (3.76) | 91.37 (3.81) |
| Pix2Pix | 92.24 (3.88) | 85.30 (7.11) | 84.68 (9.29) | 79.89 (8.49) |
| JSynR-Syn | 92.24 (3.88) | 91.42 (4.06) | 91.58 (3.64) | 91.67 (3.67) |
| JSSR-Syn | 92.24 (3.88) | 91.39 (4.10) | 91.51 (3.72) | 91.60 (3.69) |

Figure 8A:
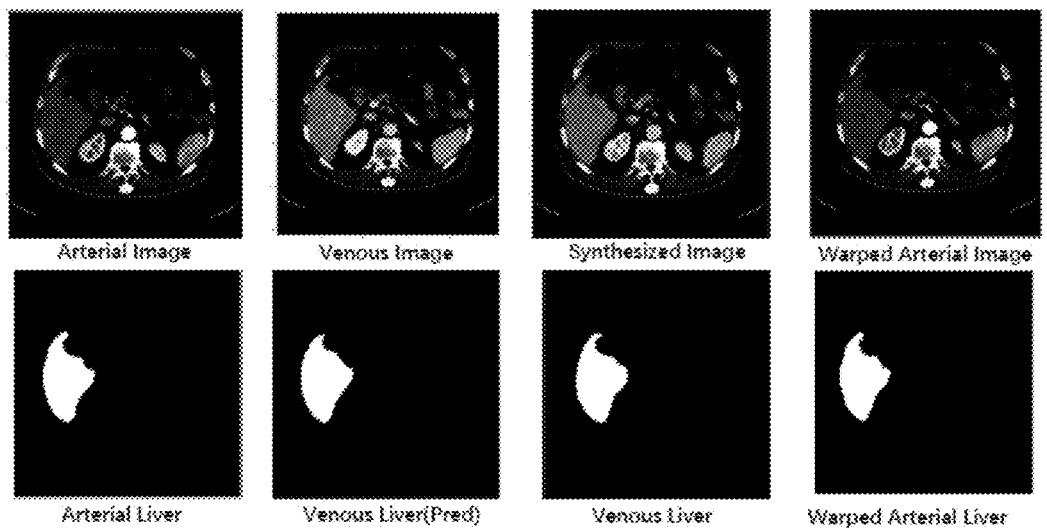
FIG. 8A illustrates JSSR processing results on abdominal CT scans of a patient in the arterial phase.
Figure 8B:
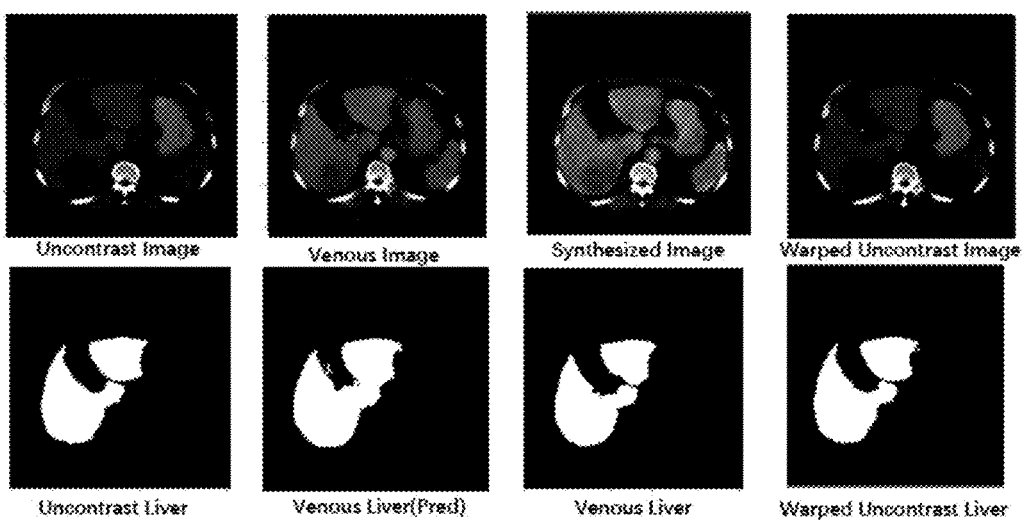
FIG. 8B illustrates JSSR processing results on abdominal CT scans of a patient in the non-contrast phase.

We show the results of the synthesis and segmentation tasks in Table 2. We evaluate the generator model by applying the segmentor model to the synthesized image. The intuition is the better the synthesized image is, the better the segmentation map can be estimated. We evaluate three segmentor models. The VNet baseline is trained on the MSD dataset with full supervision. JSegR-Seg is the segmentation part of JSegR. JSSR-Seg is the segmentor of the JSSR system. For each segmentor model, we test it on a different version of the generator model. For Non-Synthesis, we directly apply the segmentor model on original images for four phases on the test data and test for the average Dice between the prediction and annotation. For the other three generator model, we test the segmentor model on the original venous image and synthesized image from arterial, delay, non-contrast phase. From the Non-Synthesis lines, we can observe performance drop if directly applying the segmentor model to arterial, delay, and non-contrast phases, since the supervised data is all from the venous phase. Among the three phases, the delay phase drops the least, while non-contrast drops the most, indicating that the domain gap between venous and delay is bigger than between venous and non-contrast. For Pix2Pix, the performance goes through different level of decrease among different segmentors and is not as high as the Non-Synthesis. That may be caused by the artifact introduced by the GAN model and the L1 term is providing less constraint since there is no paired data. For the JSynR-Syn and JSSR-Syn, the performance is better by giving paired data from the register but is just comparable to Non-Synthesis. For JSynR-Syn, it is because the JSynR is not jointly learned with a segmentor, so the performance for a synthesized image does not necessarily go up. For JSSR-Syn, however, it means the constraint we are using for optimizing the system does not bring enough communication between the generator and the segmentor. In the meantime, we can see the significant improvement from VNet to JSegR-Seg to JSSR-Seg on the Non-Synthesis data, meaning that although the generator and segmentor are not well connected, the segmentor can still benefit from a joint system including the synthesis part. Refer to FIGS. 8A and 8B for qualitative examples of JSSR registration, synthesis, and segmentation results, where FIG. 8A shows results on the arterial CT phase and FIG. 8B shows results on the non-contrast CT phase. In each of FIGS. 8A and 8B, the first panel from left of the top row shows a moving image in the first modality (arterial phase image in FIG. 8A and non-contrast phase image in FIG. 8B); the second panel from left of the top row shows a fixed image in the second modality (venous phase image); the third panel from left of the top row shows a synthesized image generated from the moving image in the second modality; the right-most panel of the top row shows a warped moving image from applying a spatial transformation of the register model on the moving image; the first panel from left of the bottom row shows a segmented liver image in the first modality (arterial phase image in FIG. 8A and non-contrast phase image in FIG. 8B); the second panel from left of the bottom row shows a predicted segmented liver image in the second modality; the third panel from left of the bottom row shows segmented liver image in the second modality; and the right-most panel of the bottom row shows a warped segmented liver image in the first modality.

To perform an ablation study to compare JSegR vs JSSR, we implement JSegR as another ablation. The purpose is to explore the importance of the synthesis module in the JSSR system. Since JSegR does not have a generator, the register takes images from different phases directly as input. The segmentation consistency term in Eq. (8) is then turned into:

$$\mathcal{L}_{dice}^{reg}(S,\Phi)=E_{x,y}1-\text{Dice}[\tau(S(x)),S(y)], \quad (12)$$

where $\tau=\Phi(x, y)$. This framework includes jointly learning the register and segmentor as in certain previous works. However, in the present disclosure, x, y are in different domains and the annotation is unavailable for neither of them. Intuitively, this approach may work properly since x, y are in different phases. However as shown in Table 2, the performance drop across phases is not too severe even for the baseline V-Net, and with that imperfect segmentor, the JSegR may achieve a better result on registration than JSynR and close to JSSR, which shows the great importance of incorporating semantic information in the registration. But for the data with a larger domain gap such as CT and MM, the synthesis part is still necessary to regularize the system.

In the experiments, we do not introduce all the constraints in FIG. 1 because the joint training process may be sensitive to some of the constraints. We have tried several extra constraints as the ablation. One of them is adding $$\mathcal{L}_{L1}^{reg}(\Phi,G)=E_{x,y}\|G(\tau(x),y)-\tau(G(x,y))\|_1, \quad (13)$$

where $\tau=\Phi(G(x, y),y)$. The system optimizes this term by $\tau=I$. Also, if we add Eq. (12) together with Eq. (8), the system has a chance to finally output all blank segmentation. It is likely that with more constraints and more sophisticated parameter setting, the system may converge to a better point. Since in JSSR, each component may be separated, further each component with a more powerful sub-framework to further improve the performance of the JSSR method.

Figure 9A:
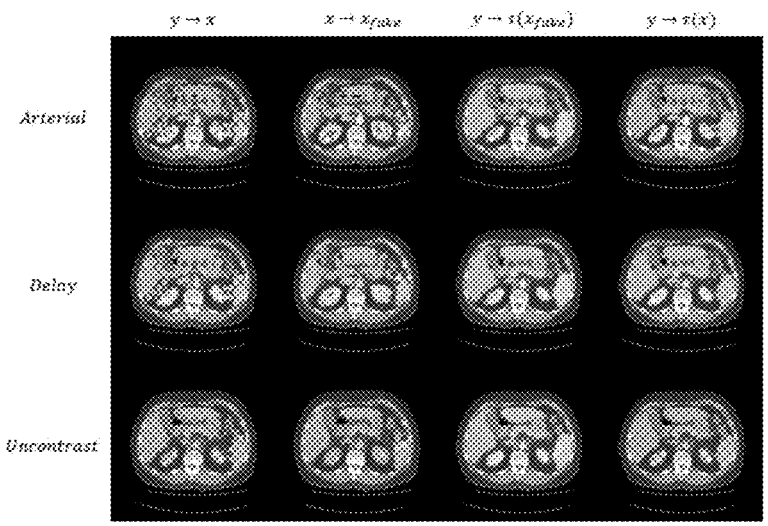
FIG. 9A illustrates image differences in an example for evaluating the image processing method.
Figure 9B:
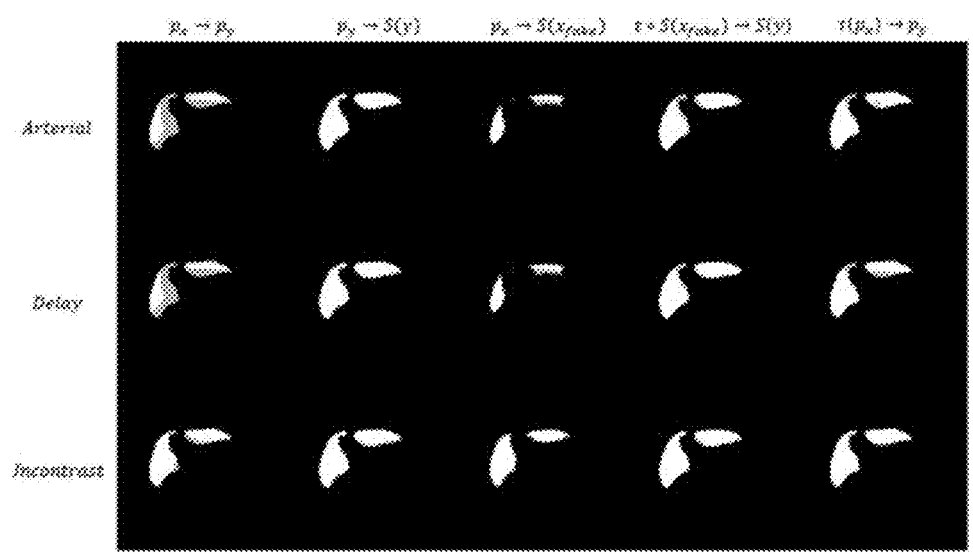
FIG. 9B illustrates segmentation results in the example shown in FIG. 9A.
Figure 12A:
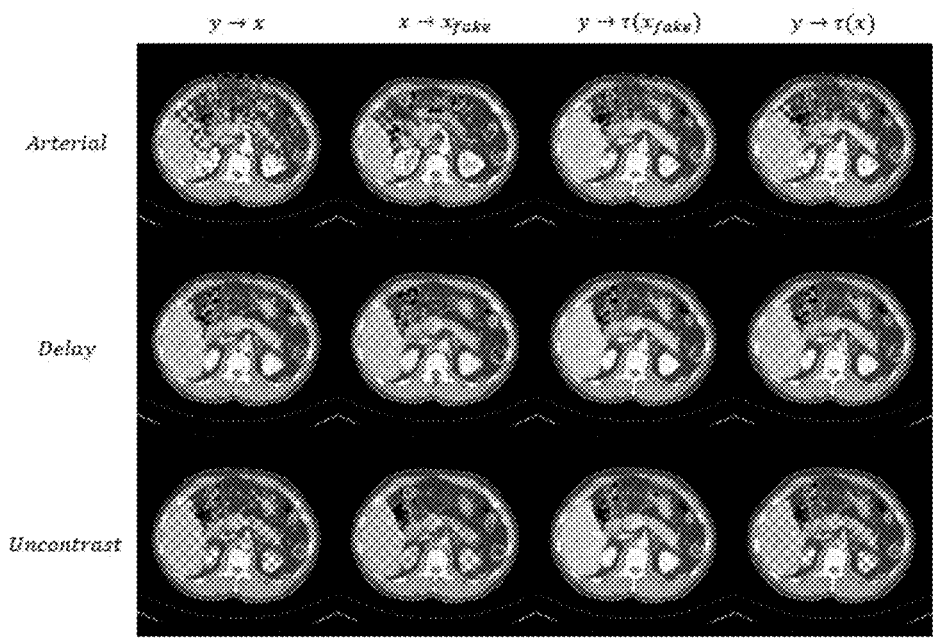
FIG. 12A illustrates image differences in another example for evaluating the image processing method.
Figure 12B:
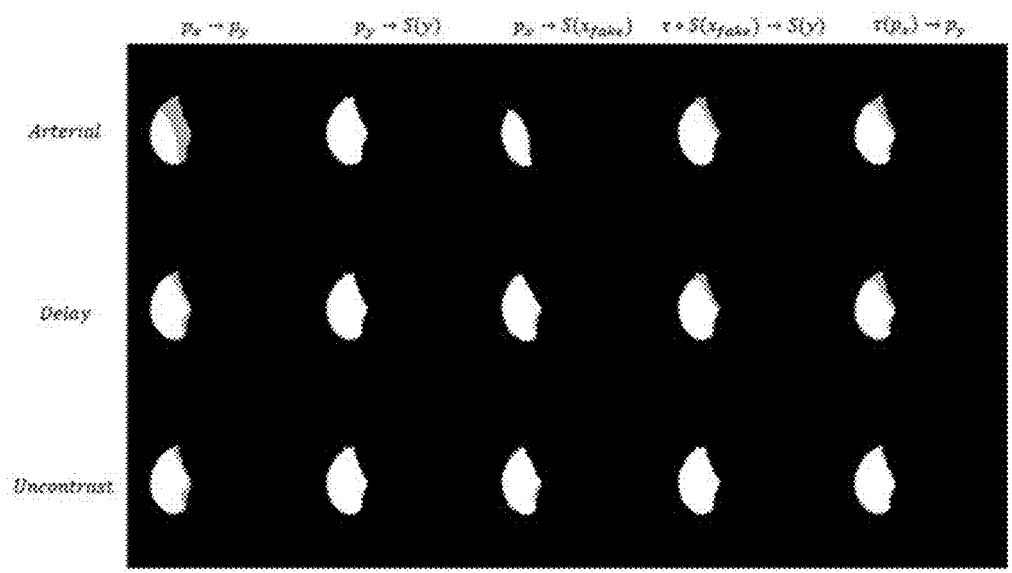
FIG. 12B illustrates segmentation results in the example shown in FIG. 12A.

Additional examples for evaluation of the JSSR process are shown in FIGS. 9A-12B. The denotations follow FIG. 5 in FIGS. 9A-12B. FIG. 9A shows one example. Specifically, FIG. 9A shows the difference between the two inputs indicated on the top (on the left and right of →), where y∈Venous and x∈Arterial, Delay, and Non-contrast for each row. FIG. 9B shows a visualization of the segmentation maps of the JSSR process corresponding to the example shown in FIG. 9A. Similarly, FIGS. 10A and 10B show the difference maps and corresponding segmentation maps in a second example. FIGS. 11A and 11B show the difference maps and corresponding segmentation maps in a third example. FIGS. 12A and 12B show the difference maps and corresponding segmentation maps in a fourth example.

As shown in the examples shown in FIGS. 9A-12B, the generator component is conditioned on both x and y, which brings both benefits and shortcomings. In the column y→-τ ($x_{fake}$), we may see that the synthesized image may well capture the intensity change between y and x since the checkerboard images only show a mild difference between y and τ($x_{fake}$). However, in the x→-$x_{fake}$ column, such as shown in the Arterial row of FIG. 9A and the Arterial row of FIG. 11A, the generator also introduces additional boundary information from y, which will affect the register.

Figure 10A:
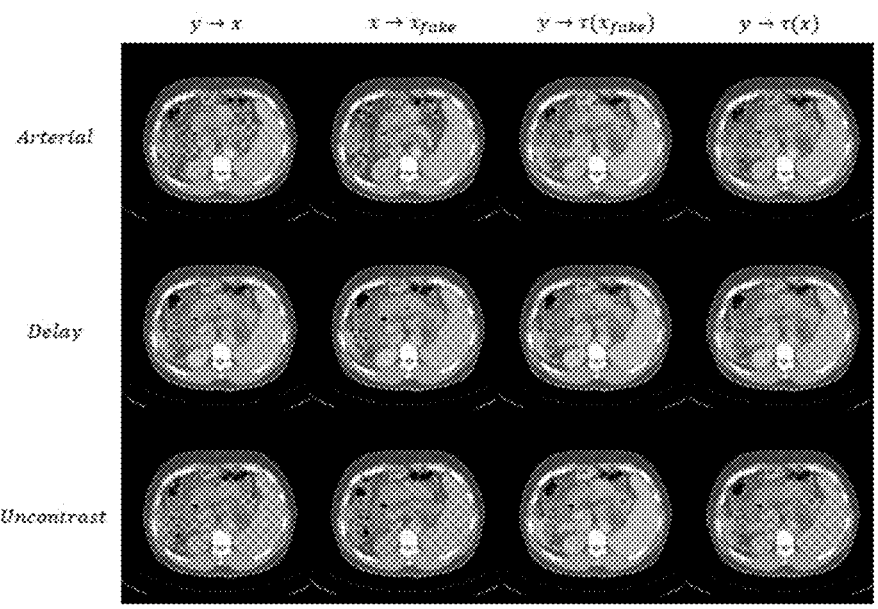
FIG. 10A illustrates image differences in another example for evaluating the image processing method.
Figure 10B:
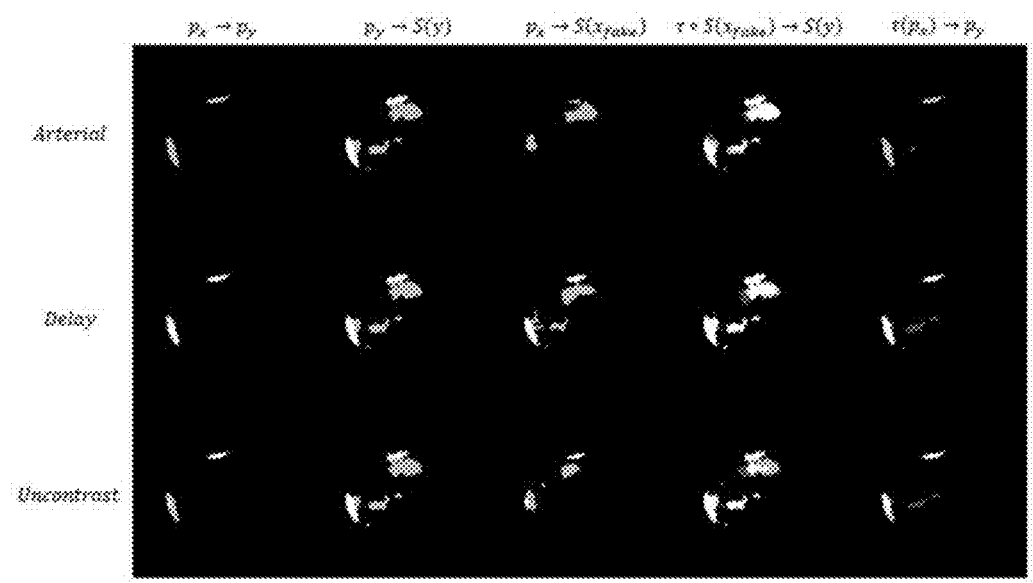
FIG. 10B illustrates segmentation results in the example shown in FIG. 10A.
Figure 11A:
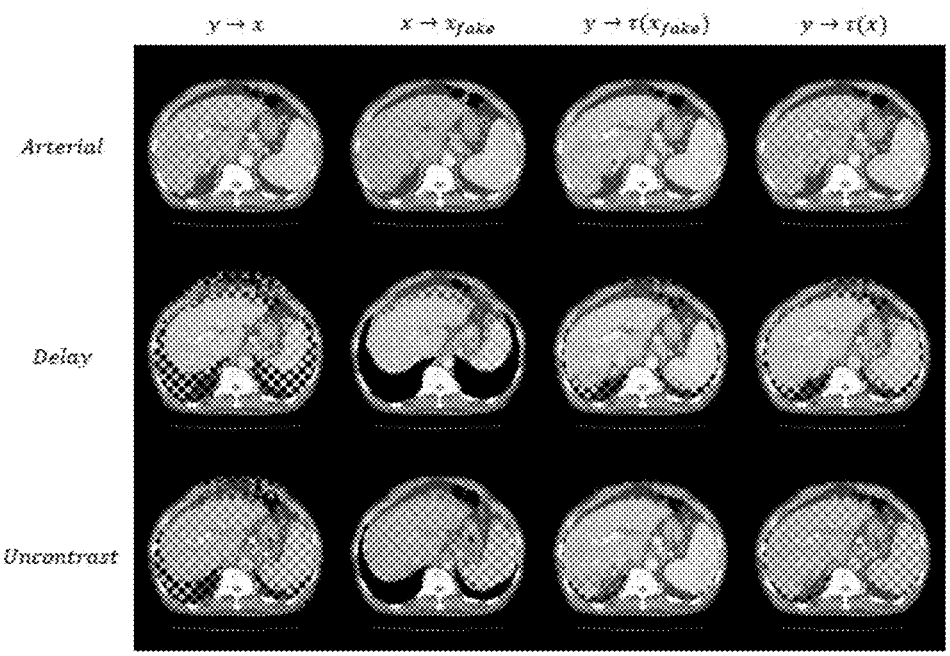
FIG. 11A illustrates image differences in another example for evaluating the image processing method.
Figure 11B:
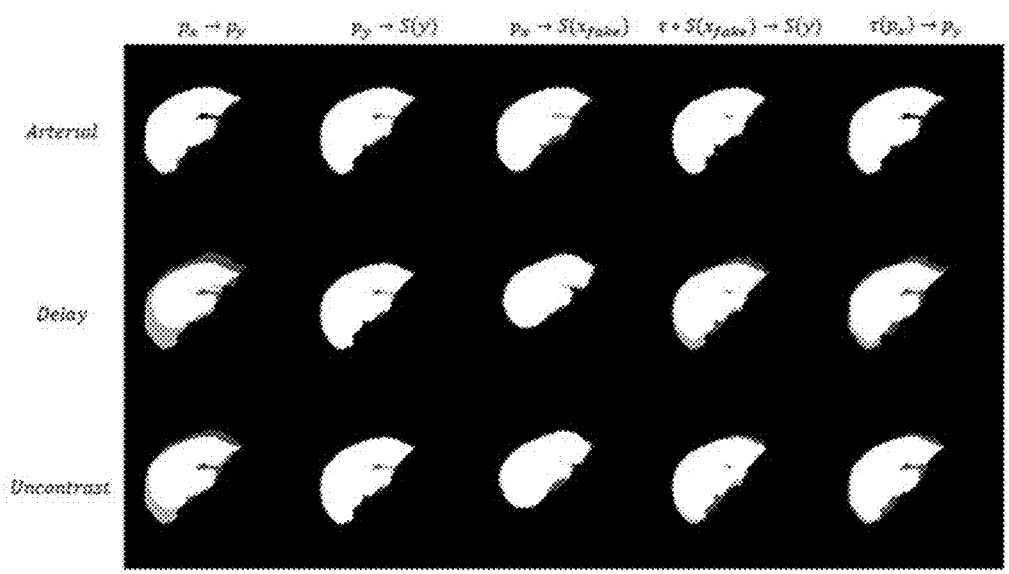
FIG. 11B illustrates segmentation results in the example shown in FIG. 11A.

Further, as in FIG. 10B, the segmentor component produces unsatisfactory segmentation but the overlap in $\tau_O$ S($x_{fake}$)→-S(y) is still significant, meaning that the consistency is well satisfied but may provide wrong supervision to the register. A better consistency term may help this condition.

Further, although the image processing method provided in the present disclosure is only tested on multi-phase CT image, since the method is equipped with a generator and a segmentor, it may be applied to many application scenes like the registration from CT to MM, or the domain adaptation for segmentation between CT and MM, or it may help tumor detection by combining multi-modality information the segmentor is used to segment both normal organ and tumor region.

In summary, the image processing method and device provided by the present disclosure offer several contributions. The JSSR process for multi-modal image registration takes advantage of joint learning based on the intrinsic connections between the synthesis, segmentation, and registration tasks. The optimization may be conducted end-to-end with several unsupervised consistency loss and each component may benefit from the joint training process. The JSSR process is evaluated on a large-scale multi-phase clinically realistic CT image dataset without segmentation annotations. After joint training, the performance of registration and segmentation increases by 0.91% and 1.86% respectively on the average Dice score on all the phases. The image processing method and device provided by the present disclosure outperform the recently proposed Voxel-Morph algorithm by 1.28%, and the state-of-the-art conventional multi-modal registration method by 0.83%, but has considerably faster inference time. Further, the provided method does not use or rely on any manual segmentation labels from this CT imaging dataset, which demonstrates the great potential of being scalable and generalizable to be widely applied in real clinical scenarios.

The method and apparatus provided in the present disclosure according to the embodiments are described in detail above. The principles and implementation manners provided in the present disclosure are described herein by using specific examples. The description of the above embodiments is only used to help understand the method provided in the present disclosure. At the same time, a person skilled in the art will make changes to the specific embodiments and the application scope according to the idea provided in the present disclosure. In summary, the contents of the present specification should not be construed as limiting the present disclosure.

The present disclosure contains material that is subject to copyright protection. The copyright is the property of the copyright holder. The copyright holder has no objection to the reproduction of patent documents or the patent disclosure in the official records and files of the Patent and Trademark Office.

What is claimed is:

1. An image processing method for performing image alignment, comprising:
   acquiring a moving image generated by a first imaging modality;
   acquiring a fixed image generated by a second imaging modality;
   jointly optimizing a generator model, a register model, and a segmentor model applied to the moving image and the fixed image according to a plurality of cost functions; and
   applying a spatial transformation corresponding to the optimized register model to the moving image to align the moving image to the fixed image;
   wherein:
      the generator model generates a synthesized image from the moving image conditioned on the fixed image;
      the register model estimates the spatial transformation to align the synthesized image to the fixed image; and
      the segmentor model estimates segmentation maps of the moving image, the fixed image, and the synthesized image.

2. The image processing method according to claim 1, wherein jointly optimizing the generator model, the register model, and the segmentor model includes:
   performing supervised learning of the segmentor model using an image dataset with ground-truth segmentation maps; and
   performing unsupervised learning of the generator model, the register model, and the segmentor model using the moving image generated by the first imaging modality and the fixed image generated by the second imaging modality.

3. The image processing method according to claim 2, wherein performing the unsupervised learning of the generator model, the register model, and the segmentor model includes:
   jointly learning the generator model and register model according to a first objective function; and
   jointly learning the generator model, the register model, and the segmentor model according to a weighted sum of the first objective function and a second objective function.

4. The image processing method according to claim 3, further including:
   generating the first objective function as a sum of a first regularized cost function for the generator model and a second regularized cost function for the register model.

5. The image processing method according to claim 4, further including:
   generating the first regularized cost function for the generator model as a weighted sum of a texture-based generation cost function and a conditional generative adversarial net (GAN) cost function, the texture-based generation cost function accounting for image textual differences, and the conditional GAN cost function conditioned on the fixed image.

6. The image processing method according to claim 4, further including:
   generating the second regularized cost function for the register model as a weighted sum of a registration cost function and a smoothness regularization term, the registration cost function accounting for image registration discrepancies, and the smoothness regularization term regularizing a non-realistic spatial transformation.

7. The image processing method according to claim 6, wherein:
   the registration cost function is calculated as an L1 loss between the warped image based on the moving image and the fixed image.

8. The image processing method according to claim 3, further including:
   generating the second objective function as a sum of a joint generation-registration-segmentation cost function and a supervised segmentation cost function, the joint generation-registration-segmentation cost function accounting for constraints between synthesis, registration, and segmentation tasks, and the supervised segmentation cost function accounting for the supervised learning of the segmentor model.

9. The image processing method according to claim 1, wherein:
   the fixed image is a venous-phase contrast computer tomography (CT) image of a patient; and
   the moving image is one of: an arterial-phase contrast CT image of the patient, a delay-phase contrast CT image of the patient, or a non-contrast CT image of the patient.

10. The image processing method according to claim 1, wherein jointly optimizing the generator model, the register model, and the segmentor model includes:
    optimizing the generator model, the register model, and the segmentor model using a first learning rate for the generator model, a second learning rate for the register model, and a third learning rate for the segmentor model, the third learning rate being greater than the second learning rate, and the second learning rate being greater than the first learning rate.

11. An image processing device for performing image alignment, comprising:
    a memory, storing computer-executable instructions; and
    a processor, coupled with the memory and, when the computer-executable instructions being executed, configured to:

acquire a moving image generated by a first imaging modality;

acquire a fixed image generated by a second imaging modality;

jointly optimize a generator model, a register model, and a segmentor model applied to the moving image and the fixed image according to a plurality of cost functions; and apply a spatial transformation corresponding to the optimized register model to the moving image to align the moving image to the fixed image;

wherein:

the generator model generates a synthesized image from the moving image conditioned on the fixed image;

the register model estimates the spatial transformation to align the synthesized image to the fixed image; and the segmentor model estimates segmentation maps of the moving image, the fixed image, and the synthesized image.

12. The image processing device according to claim 11, wherein the processor is further configured to:

perform supervised learning of the segmentor model using an image dataset with ground-truth segmentation maps; and perform unsupervised learning of the generator model, the register model, and the segmentor model using the moving image generated by the first imaging modality and the fixed image generated by the second imaging modality.

13. The image processing device according to claim 12, wherein the processor is further configured:

jointly learn the generator model and register model according to a first objective function; and jointly learn the generator model, the register model, and the segmentor model according to a weighted sum of the first objective function and a second objective function.

14. The image processing device according to claim 13, wherein the processor is further configured to:

generate the first objective function as a sum of a first regularized cost function for the generator model and a second regularized cost function for the register model.

15. The image processing device according to claim 14, wherein the processor is further configured to:

generate the first regularized cost function for the generator model as a weighted sum of a texture-based generation cost function and a conditional generative adversarial net (GAN) cost function, the texture-based generation cost function accounting for image textual differences, and the conditional GAN cost function conditioned on the fixed image.

16. The image processing device according to claim 14, wherein the processor is further configured to perform:

generate the second regularized cost function for the register model as a weighted sum of a registration cost function and a smoothness regularization term, the registration cost function accounting for image registration discrepancies, and the smoothness regularization term regularizing a non-realistic spatial transformation.

17. The image processing device according to claim 16, wherein:

the registration cost function is calculated as an L1 loss between the warped image based on the moving image and the fixed image.

18. The image processing device according to claim 13, wherein the processor is further configured to:

generate the second objective function as a sum of a joint generation-registration-segmentation cost function and a supervised segmentation cost function, the joint generation-registration-segmentation cost function accounting for constraints between synthesis, registration, and segmentation tasks, and the supervised segmentation cost function accounting for the supervised learning of the segmentor model.

19. A non-transitory computer-readable storage medium storing a plurality of instructions, wherein when the plurality of instructions are executed by a processor, cause the processor to:

acquire a moving image generated by a first imaging modality;

acquire a fixed image generated by a second imaging modality;

jointly optimize a generator model, a register model, and a segmentor model applied to the moving image and the fixed image according to a plurality of cost functions; and apply a spatial transformation corresponding to the optimized register model to the moving image to align the moving image to the fixed image;

wherein:

the generator model generates a synthesized image from the moving image conditioned on the fixed image;

the register model estimates the spatial transformation to align the synthesized image to the fixed image; and the segmentor model estimates segmentation maps of the moving image, the fixed image, and the synthesized image.

20. The non-transitory computer-readable storage medium according to claim 19, wherein the plurality of instructions further cause the processor to:

perform supervised learning of the segmentor model using an image dataset with ground-truth segmentation maps; and perform unsupervised learning of the generator model, the register model, and the segmentor model using the moving image generated by the first imaging modality and the fixed image generated by the second imaging modality.

* * * * *